(12) United States Patent
Suzuki

(10) Patent No.: US 9,712,689 B2
(45) Date of Patent: Jul. 18, 2017

(54) IMAGE PROCESSING SYSTEM, IMAGE PROCESSING METHOD, AND COMPUTER PROGRAM PRODUCT

(71) Applicant: Toshihiro Suzuki, Tokyo (JP)

(72) Inventor: Toshihiro Suzuki, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 4 days.

(21) Appl. No.: 14/912,441

(22) PCT Filed: Aug. 22, 2014

(86) PCT No.: PCT/JP2014/072662
§ 371 (c)(1),
(2) Date: Feb. 17, 2016

(87) PCT Pub. No.: WO2015/025982
PCT Pub. Date: Feb. 26, 2015

(65) Prior Publication Data
US 2016/0205273 A1    Jul. 14, 2016

(30) Foreign Application Priority Data
Aug. 22, 2013 (JP) .................. 2013-172216

(51) Int. Cl.
*G06T 5/00* (2006.01)
*H04N 1/00* (2006.01)
(Continued)

(52) U.S. Cl.
CPC ....... *H04N 1/00167* (2013.01); *G06T 1/0007* (2013.01); *G06T 5/005* (2013.01);
(Continued)

(58) Field of Classification Search
CPC .. H04N 1/00167; H04N 1/00251; H04N 1/62; H04N 2201/0094; G06T 11/60; G06T 1/0007; G06T 5/005
See application file for complete search history.

(56) References Cited

U.S. PATENT DOCUMENTS 8,520,019 B1    8/2013    Freyhult et al.
8,520,028 B1    8/2013    Freyhult et al.
(Continued)

FOREIGN PATENT DOCUMENTS

EP    2 634 751 A1    9/2013
JP    2002-171408    6/2002
(Continued)

OTHER PUBLICATIONS

International Search Report issued Nov. 25, 2014 in PCT/JP2014/072662 filed Aug. 22, 2014.
(Continued)

*Primary Examiner* — John Wallace
(74) *Attorney, Agent, or Firm* — Oblon, McClelland, Maier & Neustadt, L.L.P.

(57) ABSTRACT

An image processing system includes: an information storage unit that stores therein a plurality of pieces of case information each including retouching-time reference information referred to for specifying contents of retouching and case identification information capable of identifying a case in which the retouching is performed in accordance with the contents of the retouching; an image acquiring unit that receives input of an image and acquires the image; a case selecting unit that arranges and displays a plurality of pieces of case information on a display unit based on case identification information included in each of the pieces of case information and receives selection of case information from a user; and a case applying unit that retouches the image acquired by the image acquiring unit in accordance with the
(Continued)

contents of retouching specified by the retouching-time reference information included in the selected case information.

9 Claims, 18 Drawing Sheets

(51) Int. Cl.
    *G06T 11/60* (2006.01)
    *G06T 1/00* (2006.01)
    *H04N 1/62* (2006.01)

(52) U.S. Cl.
    CPC ......... *G06T 11/60* (2013.01); *H04N 1/00251* (2013.01); *H04N 1/62* (2013.01); *H04N 2201/0094* (2013.01)

(56) References Cited

U.S. PATENT DOCUMENTS

| | | | |
|---|---|---|---|
| 8,525,855 | B1 | 9/2013 | Freyhult et al. |
| 2001/0005427 | A1 | 6/2001 | Takemoto |
| 2002/0140740 | A1 | 10/2002 | Chen |
| 2006/0227348 | A1 | 10/2006 | Takahashi |
| 2007/0070407 | A1 | 3/2007 | Katou et al. |
| 2009/0207177 | A1* | 8/2009 | Ryu ................. G06T 11/60 345/501 |
| 2009/0319897 | A1* | 12/2009 | Kotler ............... G06F 3/04845 715/711 |
| 2013/0207997 | A1 | 8/2013 | Berger et al. |
| 2014/0129992 | A1 | 5/2014 | Berger et al. |

FOREIGN PATENT DOCUMENTS

| | | |
|---|---|---|
| JP | 2004-129226 | 4/2004 |
| JP | 2006-080746 | 3/2006 |
| JP | 2006-293643 | 10/2006 |
| JP | 2007-096904 | 4/2007 |
| JP | 2007-221591 | 8/2007 |
| JP | 2008-294969 | 12/2008 |
| JP | 4421761 | 12/2009 |
| JP | 4646735 | 12/2010 |
| JP | 2011-044124 | 3/2011 |
| JP | 4910948 | 1/2012 |
| JP | 4985243 | 5/2012 |

OTHER PUBLICATIONS

Extended European Search Report issued Aug. 19, 2016 in Patent Application No. 14838470.4.

* cited by examiner

FIG.3
(a)
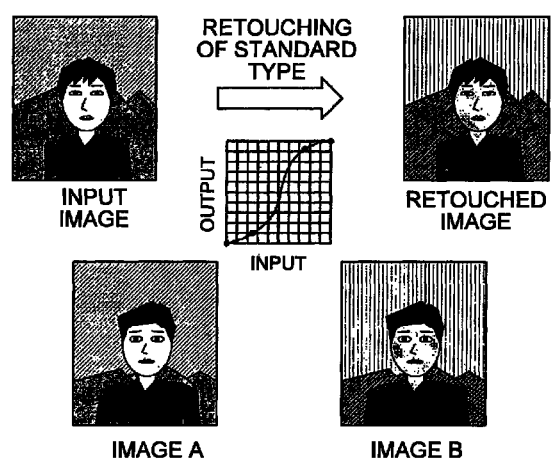
(b)
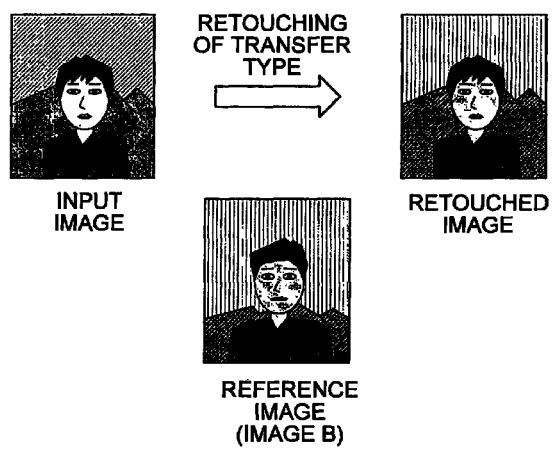

| ITEM | | CONTENTS |
|---|---|---|
| CASE IDENTIFICA- TION INFORMATION | TYPE | STANDARD TYPE |
| | CASE ID | 0001 |
| | PHOTOGRAPHING POSITION | 35°01'46.10" NORTH LATITUDE 138°47'17.34" EAST LONGITUDE |
| | PHOTOGRAPHING DATE AND TIME | 2001/01/01 00:00:00 |
| | IMAGE A | img0001.jpg |
| | COLOR TONE INFORMATION OF IMAGE A (AVERAGE Lab VALUE) | (80, 10, 10) |
| | IMAGE B | img0002.jpg |
| | COLOR TONE INFORMATION OF IMAGE B (AVERAGE Lab VALUE) | (60, 12, 12) |
| | SCENE NAME | OUTDOOR PORTRAIT |
| | SUBJECT NAME | PERSON, TARO YAMADA |
| | IMPRESSION EXPRESSION | HEALTHY |
| | SELECTED AREA INFORMATION | NULL |
| RETOUCHING- TIME REFERENCE INFORMATION | IMAGE PROCESSING OPERATOR | L TONE CURVE |
| | IMAGE PROCESSING PARAMETER | (CONTROL POINT INFORMATION) |
| | ... | ... |

(b)

| ITEM | | CONTENTS |
|---|---|---|
| CASE IDENTIFICA- TION INFORMATION | TYPE | TRANSFER TYPE |
| | CASE ID | 0001-2 |
| | PHOTOGRAPHING POSITION | 35°01'46.10" NORTH LATITUDE 138°47'17.34" EAST LONGITUDE |
| | PHOTOGRAPHING DATE AND TIME | 2001/01/01 00:00:00 |
| | IMAGE A | NULL |
| | COLOR TONE INFORMATION OF IMAGE A (AVERAGE Lab VALUE) | NULL |
| | IMAGE B | img0002.jpg |
| | COLOR TONE INFORMATION OF IMAGE B (AVERAGE Lab VALUE) | (60, 12, 12) |
| | SCENE NAME | OUTDOOR PORTRAIT |
| | SUBJECT NAME | PERSON, TARO YAMADA |
| | IMPRESSION EXPRESSION | HEALTHY |
| | SELECTED AREA INFORMATION | NULL |
| RETOUCHING- TIME REFERENCE INFORMATION | IMAGE PROCESSING OPERATOR | TRANSFER OPERATOR |
| | IMAGE PROCESSING PARAMETER | NULL (REFER TO IMAGE B) |
| | ... | ... |

FIG.9
(a)
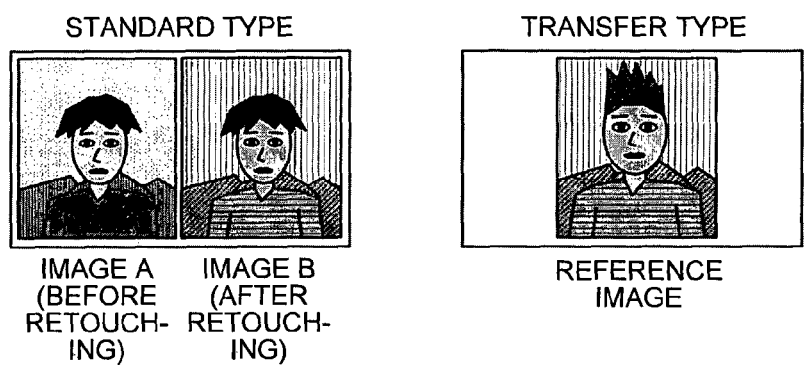
(b)
(c)
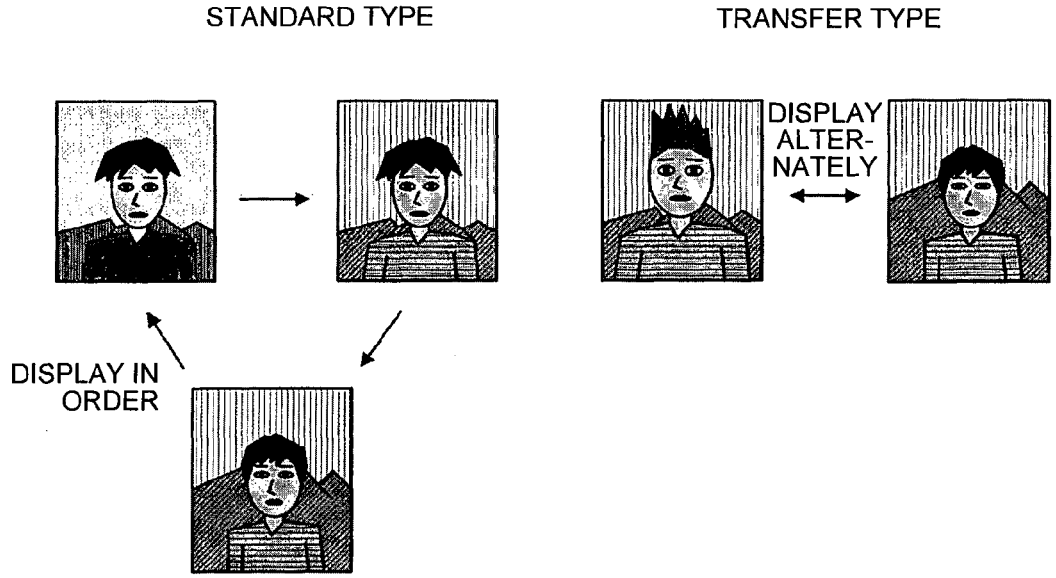

IMAGE PROCESSING SYSTEM, IMAGE PROCESSING METHOD, AND COMPUTER PROGRAM PRODUCT

TECHNICAL FIELD

The present invention relates to an image processing system and an image processing method that retouch an image and a computer program product that causes a computer to perform the method.

BACKGROUND ART

Images taken on digital cameras or the like are subjected to image retouching (correction) to revise a part having a defect and eliminate the defect. Such retouching is performed by, for example, changing image representation, such as color tone and sharpness.

There are the following two types of image retouching: a type in which a user or an apparatus specifies away, a parameter, or the like of image processing and retouching is accordingly performed (hereinafter, referred to as a standard type); and a type in which a feature amount, or the like is specified and retouching is performed toward the target (hereinafter, referred to as a transfer type). Besides the classification by the retouching type, there are also the following three types by the contents specified by the user.

The first type is a type in which the user directly specifies an operation (an operator) and parameters of image retouching (hereinafter, referred to as a way specification type). The second type is a type in which the user specifies a target in an image format or the like (hereinafter, referred to as a target specification type). The third type is a type in which the user specifies a retouched image that finally meets his/her expectation from a plurality of retouched images (hereinafter, referred to as a result specification type).

By combining the former two types and the latter three types, six types in total are conceivable. Because there is no method that can satisfy both the transfer type and the way specification type, there are actually five types.

Examples of the standard type include tone curve conversion, sharpness conversion, and edge enhancement. Because these ways are publicly known, detailed explanations thereof are omitted. In these ways, the parameters can be optionally changed, thereby providing high processing flexibility. To achieve a target, however, trial and error is required, and proficiency is required. Examples of the combination of the standard type and the way specification type include a technique for causing a user to designate colors of designated pixels and desired colors thereof and adjusting colors of the entire image based on these colors (refer to Patent Literature 1).

There has also been developed a technique for creating a color conversion list indicating a correspondence relation between pixel values before and after adjustment based on the adjustment result of image data and applying the color conversion list to another image, thereby correcting the image (refer to Patent Literature 2). There have also been developed a technique for facilitating creation of a color conversion list including user interaction (refer to Patent Literature 3) and a similar technique assuming video as an object to be processed (refer to Patent Literature 4).

Examples of the combination of the standard type and the target specification type include a technique for displaying effects in an icon form to a user and causing the user to select an effect, which is performed by an application called Instagram. Examples of the combination of the standard type and the result specification type include a technique for specifying a small number of typical processing and parameters in advance, displaying these and retouched images in pairs to a user, and causing the user to select a retouched image (refer to Patent Literature 5).

Examples of the combination of the transfer type and the target specification type include a technique for matching image characteristics (e.g., highlight density, shadow density, and average density) with those of a reference image to uniform the color tone or the like of finished photo prints of similar scenes (refer to Patent Literature 6). There has also been developed a technique for causing a user to select a target face image (area) and matching the color tone of a color area of a face image in an input image to that of the color area of the target face image to uniform the color tone of the face of the same subject in a digital photo printer (refer to Patent Literature 7). There has also been developed a technique for correcting image reproduction items (color reproduction, tone reproduction, and contour reproduction) of an input image such that the image reproduction items approach those of reference teacher data for intuitively performing desired image reproduction (refer to Patent Literature 8).

Examples of the combination of the transfer type and the result specification type include a technique for selecting a desired first image from results obtained by correction processing performed such that a second feature amount of a second image to be corrected approaches respective first feature amounts of a plurality of types of first images (refer to Patent Literature 9).

The combination of the standard type and the way specification type provides simple options to the user at the expense of the processing flexibility, which is an advantage of the standard type, thereby limiting the processing flexibility. Furthermore, the combination has difficulty in prediction in that how the overall impression of the image is changed by a result of application of color conversion in pixel units cannot be seen until the processing is actually performed. In the combination of the standard type and the target specification type, the actual effects depend on the input image. Thus, the combination also has difficulty in prediction and requires trial and error. The combination of the standard type and the result specification type has no difficulty in prediction because the user can select an image from the retouched images. The combination, however, provides options to the user at the expense of the processing flexibility, thereby limiting the processing flexibility.

The combination of the transfer type and the target specification type does not allow the user to optionally change the way and parameter, thereby extremely limiting the processing flexibility. The combination can alleviate the difficulty in prediction compared with the combinations described above but cannot eliminate it. The combination of the transfer type and the result specification type can eliminate the difficulty in prediction but cannot solve the problem of limiting the processing flexibility similarly to the combination of the transfer type and the target specification type.

As described above, the combinations of two types can eliminate the difficulty in prediction compared with the standard type alone but limit the processing flexibility. If the standard type alone is used to increase the processing flexibility, the difficulty in prediction occurs. If the difficulty in prediction does not arise, the intuitiveness and the usability are increased and a desired result can be obtained by small workload. Thus, it is desired to provide a system and a method that can achieve intuitive and simple use, reach a desired result by small workload, and increase the processing flexibility.

SUMMARY OF THE INVENTION

An image processing system performs retouching of an image. The image processing system includes: an information storage unit that stores therein a plurality of pieces of case information each including retouching-time reference information referred to for specifying contents of retouching and case identification information capable of identifying a case in which the retouching is performed in accordance with the contents of the retouching; an image acquiring unit that receives input of the image and acquires the image; a case selecting unit that arranges and displays a plurality of pieces of case information stored in the information storage unit on a display unit based on case identification information included in each of the pieces of case information and receives selection of case information from a user; and a case applying unit that retouches the image acquired by the image acquiring unit in accordance with the contents of retouching specified by the retouching-time reference information included in the selected case information.

BRIEF DESCRIPTION OF DRAWINGS

FIG. 3 is a schematic for explaining types of image retouching;

FIG. 4 is a diagram for explaining case information;

FIG. 9 is a schematic of a display example of a target specification type and a result specification type;

DESCRIPTION OF EMBODIMENTS

Figure 1:
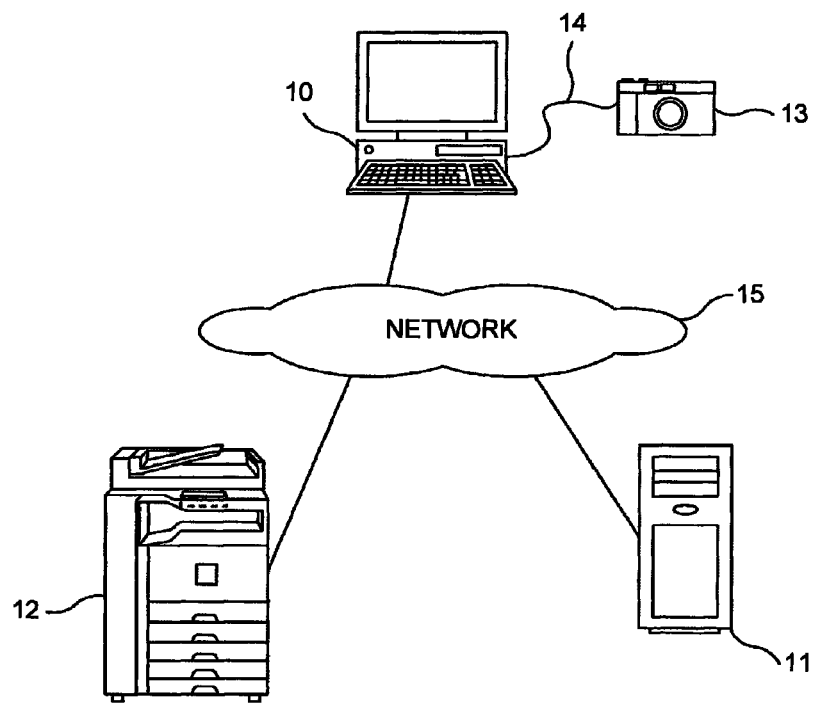
FIG. 1 is a schematic of an exemplary configuration of an image processing system according to an embodiment.

FIG. 1 is a schematic of an exemplary configuration of an image processing system. The image processing system includes an image processing apparatus 10 and a server 11 that stores therein case information, which will be described later. If the case information is stored not in the server 11 but in a storage device included in the image processing apparatus 10, the image processing system may be formed of the image processing apparatus 10 alone. The case information may be stored in a device other than the image processing apparatus 10 and the server 11. In this case, the image processing system is formed of the image processing apparatus 10 and the device.

The example illustrated in FIG. 1 further includes an image reading device 12 and an image capturing device 13 besides the image processing apparatus 10 and the server 11. The image reading device 12 reads a document or the like and inputs an image to the image processing apparatus 10 as image data. The image capturing device 13 captures an image of a subject and inputs the image to the image processing apparatus 10 as image data. The server 11 stores therein image data serving as an image besides the case information and can read and transmit the image data in response to a request from the image processing apparatus 10.

In the image processing system illustrated in FIG. 1, the image processing apparatus 10 and the image capturing device 13 are directly connected to each other with a cable 14. The image processing apparatus 10, the image reading device 12, and the server 11 are connected to one another via a network 15.

The image processing system may include two or more image processing apparatuses 10, servers 11, image reading devices 12, and image capturing devices 13 or may further include other devices. While the connection with the cable 14 is made in FIG. 1, the connection may be made via wireless communications. The image processing apparatus 10, the image reading device 12, and the server 11 may be connected not via the network 15 but directly with a cable.

The apparatuses may be connected to the network 15 via a cable or wireless communications. If the apparatuses are connected to the network 15 via wireless communications, they may be connected thereto via a base station called an access point. The network 15 may be a wide area network (WAN) or the Internet, for example.

The image processing apparatus 10 may be a personal computer (PC) or a tablet terminal that can retouch an image, for example. The hardware configuration, the functions, and the processing contents of the image processing apparatus 10 will be described later.

The server 11 may be a PC or a work station, for example. Because the hardware configuration of the server 11 may be the same as that of the image processing apparatus 10, an explanation thereof is omitted. The image processing apparatus 10 can access the server 11 to request case information and image data from the server 11 and acquire the requested case information and image data from the server 11.

The image reading device 12 may be a scanner or a multi-function peripheral (MFP), for example. The image reading device 12 includes a document table, a light source, a mirror, a photoelectric conversion element, and an analog/digital (A/D) converter. The document table is used to set a document at a predetermined position. The light source irradiates the document with light. The mirror guides light traveling from the document in a predetermined direction. The photoelectric conversion element converts the light into an electrical signal. The A/D converter converts the electrical signal into digital data. The image reading device 12 outputs the digital data resulting from conversion to the image processing apparatus 10 as image data.

The image capturing device 13 may be a digital camera or a video camera, for example. A digital camera, for example, includes an optical system, a light receiving element, and an image arithmetic circuit. The optical system includes a lens and a diaphragm mechanism. The light receiving element receives light entering through the lens and outputs the light as an electrical signal. The image arithmetic circuit performs processing for converting the output electrical signal into digital data, for example. The digital camera further includes a memory, a display device, and an interface (I/F). The memory records the digital data resulting from processing as image data. The display device displays an image obtained by image capturing. The I/F is used to connect an electronic flash, an operation switch, and a cable. The image processing apparatus 10 can access the memory to read and acquire the image data recorded in the memory.

Figure 2:
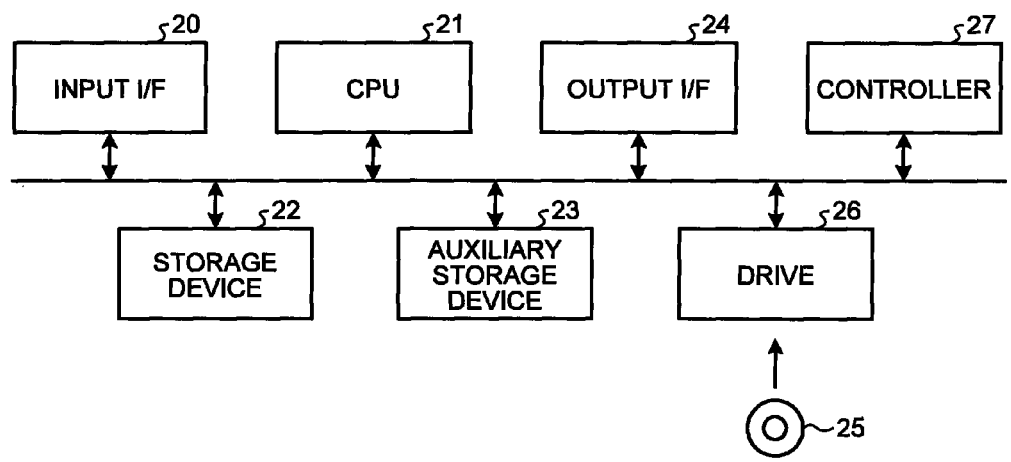
FIG. 2 is a hardware configuration diagram of the image processing system according to the present embodiment.

The following describes the hardware configuration of the image processing apparatus 10 with reference to FIG. 2. Similar to a typical PC, the image processing apparatus 10 includes an input I/F 20, a central processing unit (CPU) 21, a storage device 22 such as a memory, an auxiliary storage device 23 such as a hard disk drive (HDD), an output I/F 24, a drive 26 to which a storage medium 25 is inserted, and a controller 27. To connect the image capturing device 13 to the image processing apparatus 10 with the cable 14, for example, one end of the cable 14 is connected to the input I/F 20. The other end of the cable 14 is connected to the image capturing device 13.

The CPU 21 executes a computer program stored in the auxiliary storage device 23, thereby controlling the image processing apparatus 10 and providing a predetermined function. The provided predetermined function performs image retouching. The storage device 22 provides a work area to the CPU 21 and stores therein a boot program, firmware, and configuration parameters, for example. To connect a display device, which is not illustrated, to the image processing apparatus 10 with a cable, one end of the cable is connected to the output I/F 24. The other end of the cable is connected to the display device, which is not illustrated.

The recording medium 25 records a computer program for performing the image retouching, for example. The computer program is installed in the auxiliary storage device 23 via the drive 26 that controls reading and writing of the recording medium 25. The controller 27 functions as a network I/F used to connect the image processing apparatus 10 to the network 15 and controls communications with the network 15. The computer program described above may be independent program software or may be installed in a printer driver.

An outline of the present invention will be described before an explanation of specific functions of the image processing apparatus 10 and processing performed by the functions. A standard type that performs retouching using a specified way and parameter of image processing has a drawback in that proficiency is required and trial and error is required. A combination of the standard type and a way specification type and a combination of a transfer type and a target specification type that retouches an image such that the image approaches an image referred to as a target, for example, have a drawback of low processing flexibility. These have a correlation with each other, and the conventional technologies cannot eliminate both of these drawbacks.

To eliminate both of these drawbacks, the present invention makes the granularity (unit) of image retouching larger than that of the standard type and introduces a system that can register and reuse those. The unit that can be registered and reused is defined as a case. The case is a specific example of retouching performed by an expert and can supply case information including the contents of the retouching, used parameters, and images before and after the retouching, for example. By applying such a case, the user can retouch an image into a desired image without proficiency or trial and error. Furthermore, selecting and applying a desired case among a lot of cases makes it possible to increase the processing flexibility.

Thus, although it is required to collect cases, the transfer type is effective in terms of efficient collection of the cases. This is because it is only necessary to collect desired images alone and it is not necessary to record input images or the processes of retouching. However, it is not advisable to exclude the standard type in terms of the following two points: a lot of professional retouchers (persons who professionally edit photos) actually perform retouching of the standard type; and retouching of the transfer type is still developing at present.

More specifically, only experts can appropriately perform image retouching of the standard type. Because the experts have a lot of knowledge and experiences, they understand what result is obtained by using certain image processing ways to certain extents and in a certain order. The experts can handle various types of image patterns and have an ability to evaluate the quality of an image that is retouched (a retouched image). Because the experts have these skills comprehensively, they can perform image retouching of the standard type. These skills, however, are extremely variable and difficult to readily externalize. As a result, beginners and persons with little experience learn the skills through a process of trial and error while being taught by the experts for now. However, it is difficult even for the experts to clearly express the skills in words and convey them.

The only method for externalizing these skills is to accumulate and use specific examples of image retouching performed by the experts. The present invention introduces an information format called a case, thereby accumulating and using methods selected by the experts. This makes it possible to use, for the transfer type, methods and images accumulated in the standard type.

Figure 5:
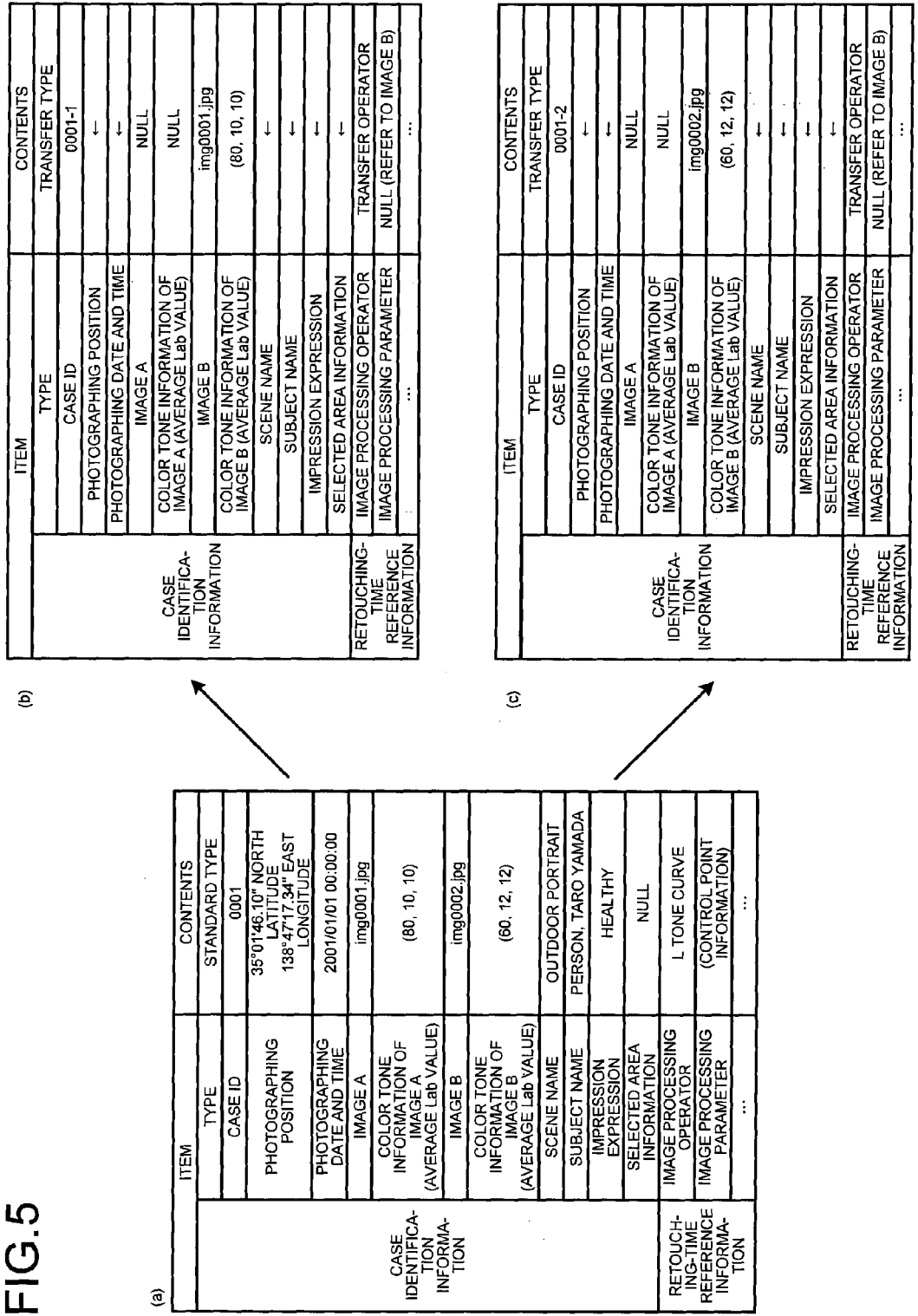
FIG. 5 is a diagram of an example in which pieces of case information of a standard type and a transfer type are hierarchized.

The following describes retouching and case information of each type with reference to FIG. 3 to FIG. 5. FIG. 3(*a*) is an exemplary schematic of retouching of the standard type. The retouching is performed using two images (case images) before and after retouching used in a case and a tone curve, which is an image processing way applied in the case. The tone curve is the way for performing tone correction on an image and is used for tone correction to covert a first image A of the two case images into a second image B. When an image to be retouched is input as an input image, the image is converted based on the tone curve, and an image resulting from conversion is output as a retouched image. The tone curve can be represented by a tone conversion function, and an image can be converted with the function. In FIG. 3(a), the retouching changes the background, the color of the face of the person, and the color of the clothes, for example.

FIG. 3(b) is an exemplary schematic of retouching of the transfer type. The retouching is performed using an image (a reference image) referred to as a target alone. Because the transfer type performs retouching such that an image approaches the reference image, it requires the reference image alone. The transfer type can perform retouching using a known method, such as color transfer (http://www.thegooch.org/Publications/PDFs/ColorTransfer.pdf). In FIG. 3(b), the retouching changes the background, the color of the face of the person, and the color of the clothes, for example.

FIG. 4(a) is an exemplary diagram of case information of the standard type, and FIG. 4(b) is an exemplary diagram of case information of the transfer type. The case information includes retouching-time reference information and case identification information. The retouching-time reference information is referred to for specifying the contents of retouching. The case identification information can identify the case in which retouching is performed in accordance with the contents of retouching. FIG. 4 indicates an image processing operator and an image processing parameter as the retouching-time reference information.

The image processing operator indicates the image processing way. FIG. 4(a) indicates an operator name "L tone curve" as the image processing operator, whereas FIG. 4(b) indicates an operator name "transfer operator". The image processing parameter is a parameter used for the way. FIG. 4(a) indicates control point information used to create the tone curve as the image processing parameter, whereas FIG. 4(b) indicates NULL because no parameter is present. FIG. 4(b) describes "refer to image B" in parentheses after NULL, thereby indicating that the image B is used as the reference image.

The case identification information may be any type of information as long as it can distinguish the case from other cases. FIG. 4 indicates a type, which is a type of retouching, a case identifier (a case ID), a photographing position, photographing date and time, an image file name, color tone information, a scene name of a photographing scene, a subject name of a photographing subject, impression expression expressing an impression of an image, and selected area information when an area in the image is selected. If the retouching-time reference information can distinguish the case from other cases, the information may be included in the case identification information.

Because FIG. 4(a) is the standard type, the type is set to the standard type, information of latitude and longitude is indicated as the photographing position of the image, the name of a person in the image is indicated as the subject name, and an impression of the person is indicated as the impression information. Because the standard type requires two images as the case images, the file names and the color tone information of an image A and an image B are also registered.

Because FIG. 4(b) is the transfer type, the type is set to the transfer type, and the other items are set similarly to those in FIG. 4(a). Because the transfer type requires a reference image alone, FIG. 4(b) indicates the file name and the color tone information only of the image B, which is the reference image. Thus, the fields of the file name and the color tone information of the other file are supplied with "NULL", which indicates that no information is present.

While the case information is represented in a table format, it can actually be represented by a description method of such as extensible markup language (XML). The XML is given by way of example, and another description method may be employed.

The two case images collected in the case of the standard type may be used as two reference images of the transfer type. Case information of the standard type illustrated in FIG. 5(a) is the same as that illustrated in FIG. 4(a). By using the information of the image A and the information of the image B in the case information as reference information, it is possible to create pieces of case information illustrated in FIG. 5(b) and FIG. 5(c). As illustrated in FIG. 5, the pieces of case information can be retained in a hierarchized manner in which FIG. 5(a) serves as a route node and FIG. 5(b) and FIG. 5(c) serve as child nodes connected to the route node. This makes it possible to provide a system that can perform retouching of both the standard type and the transfer type. The arrows in FIG. 5(b) and FIG. 5(c) indicate that contents in FIG. 5(b) and FIG. 5(c) are the same as those of the items corresponding thereto in FIG. 5(a).

To achieve intuitive and simple use, it is preferable that the case be visually displayed in some form to provide options to the user. If the number of cases is small, the pieces of case information can be displayed side by side without any change.

Figure 6:
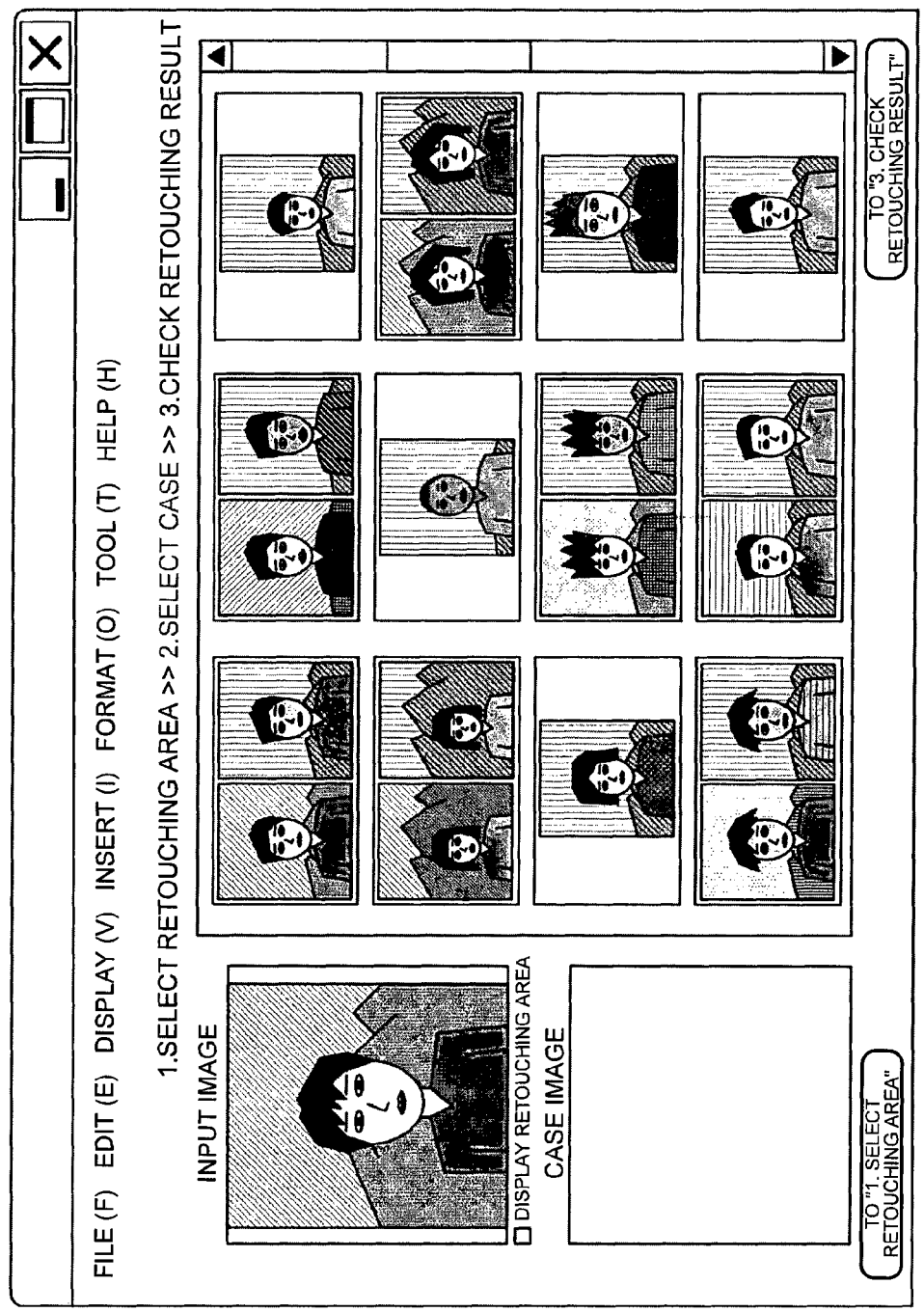
FIG. 6 is an exemplary schematic of a screen used to select one piece of case information from a plurality of pieces of case information.

As the collection and registration of the cases proceed, however, all the cases cannot be displayed at a time even in a manner displayed side by side as described above because the number of cases displayed at a time has an upper limit. As illustrated in FIG. 6, case images and reference images serving as the cases that can be displayed at a time are several to several tens of images. Thus, the images need to be displayed by scrolling a screen with a scroll bar or the like. When no restriction is placed on display and the images are randomly arranged, it is extremely difficult to find preferable case information.

To address this, the case information includes the case identification information. The pieces of case information are not randomly arranged but appropriately arranged and displayed on a display unit, which is a display device, based on the case identification information (such that the pieces of case information are arranged based on the type or the color tone information, for example). This can solve the problem of difficulty in finding preferable case information.

A specific explanation will be made using a skin color of a face image as an example with reference to FIG. 7. The case identification information includes selected area information used to select a specific area, such as a face area, and color tone information of the area selected based on the selected area information. The color tone information is an average Lab value, for example. L denotes a dimension indicating the lightness, whereas a and b denote color dimensions. The color tone information is represented by a coordinate value in the Lab color space, such as (80, 10, 10), illustrated in FIG. 4 and FIG. 5. The color tone information may be calculated and registered in registration or calculated at the time when needed.

The transfer type performs retouching using the color tone information of the face image in the image B serving as the case image. By setting a rule to use the color tone information on the standard type or causing the user to make a selection, pieces of case information of both the standard type and the transfer type can be two-dimensionally arranged regardless of the type of the case. The display may be in an image format, such as icons and thumbnails, or in a language format, such as the case IDs and the photographing positions. In FIG. 7, a list of pieces of case information is displayed in the image format.

Figure 7:
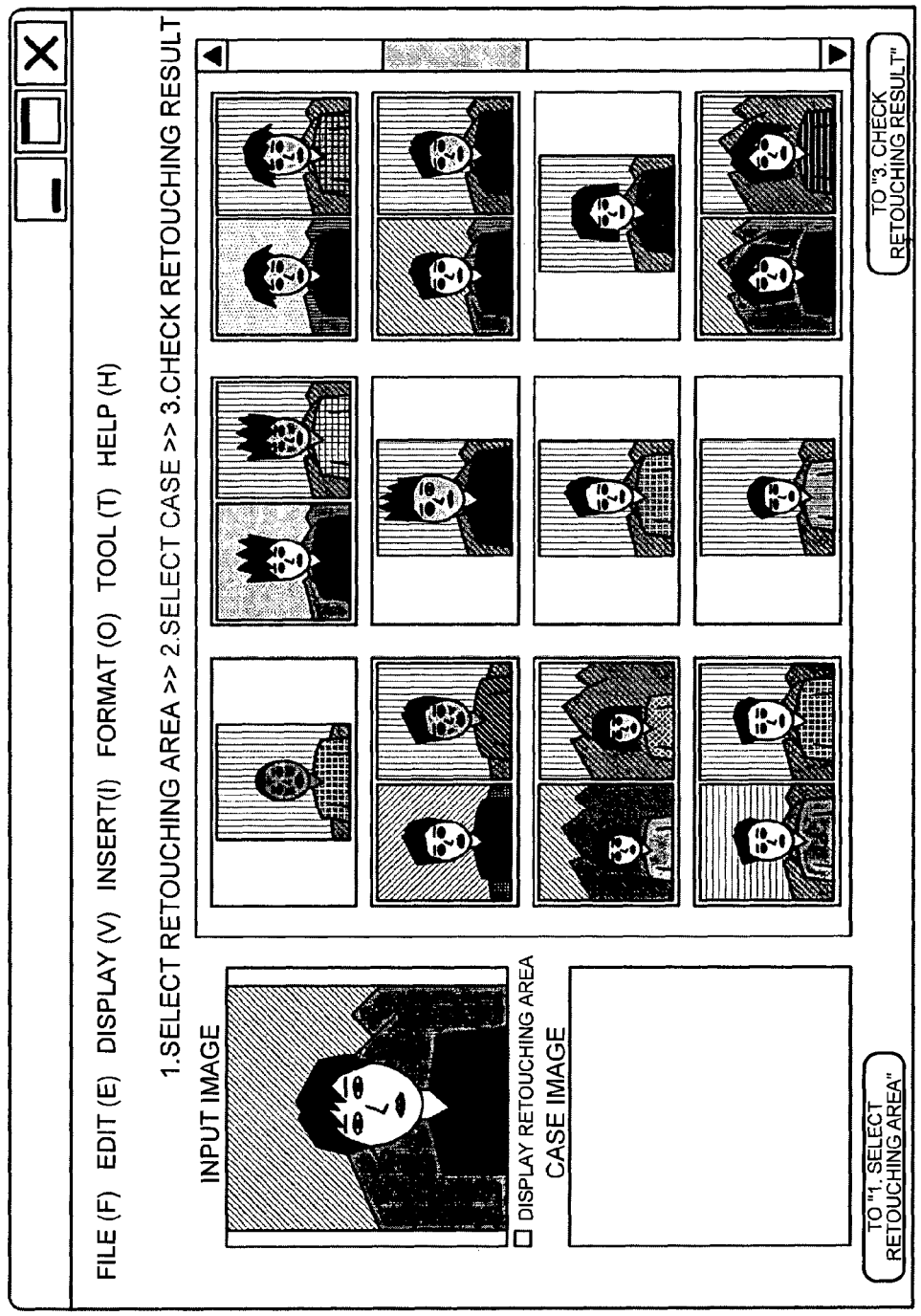
FIG. 7 is a schematic of an example of a screen that arranges and displays pieces of case information based on case identification information.
Figure 8:
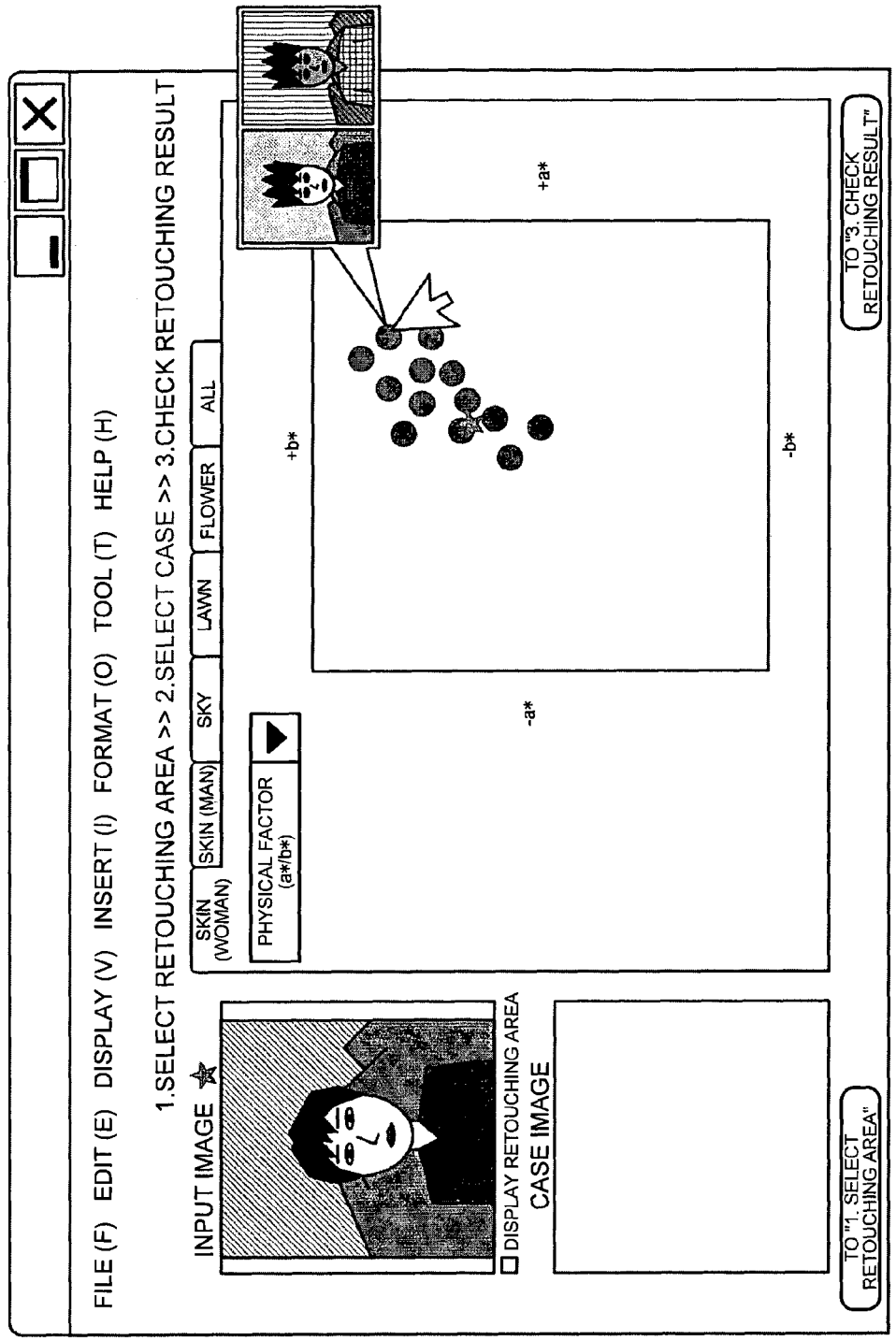
FIG. 8 is a schematic of another example of the screen that arranges and displays pieces of case information based on the case identification information.

The pieces of case information may be displayed as a list as illustrated in FIG. 7. Alternatively, the pieces of case information may be displayed by using the ab plane (two dimensions) in the Lab space as a map and displaying the cases as respective points as illustrated in FIG. 8. When a cursor is moved to a desired point and stopped thereon, the case information may be displayed as an icon. Furthermore, the current input image may be represented by a symbol distinguishable from the points, by a star in FIG. 8, thereby enabling the user to more intuitively select a target. While the skin color of the face image is used as an example, the pieces of case information may be arranged based on the scene name and the subject name instead of the skin color, for example.

If all the pieces of case information are displayed as a list, the pieces of information as much as there exist need to be displayed. Because the user often selects case information from a single category, the number of pieces of displayed case information can be reduced by limiting the objects to be displayed to a list of those in the category. By making the items, such as the scene name and the subject name, in the case identification information selectable as a category, for example, it is possible to reduce the number of pieces of displayed case information. In FIG. 8, categories, such as "sky", "lawn", and "flower", can be selected with tabs.

In terms of selection of the type, the standard type needs to display two case images for each piece of case information, whereas the transfer type simply needs to display a reference image alone as illustrated in FIG. 9(a). Thus, the transfer type can display more pieces of case information at a time. Specifying a target is also possible. As illustrated in FIG. 9(b), regarding the standard type, the two case images can be displayed not side by side but alternately at certain time intervals. This makes it possible to display more pieces of case information at a time similarly to the transfer type.

The displayed image may be the two case images in the standard type and the reference image in the transfer type. Alternatively, both types may also display a retouched image resulting from retouching performed in accordance with the contents of retouching in the respective cases as illustrated in FIG. 9(c). This enables the result specification. Also in this case, the standard type can display the three images including the retouched image alternately. The transfer type can also display the two images including the retouched image alternately. This makes it possible to display more pieces of case information at a time.

Figure 10:
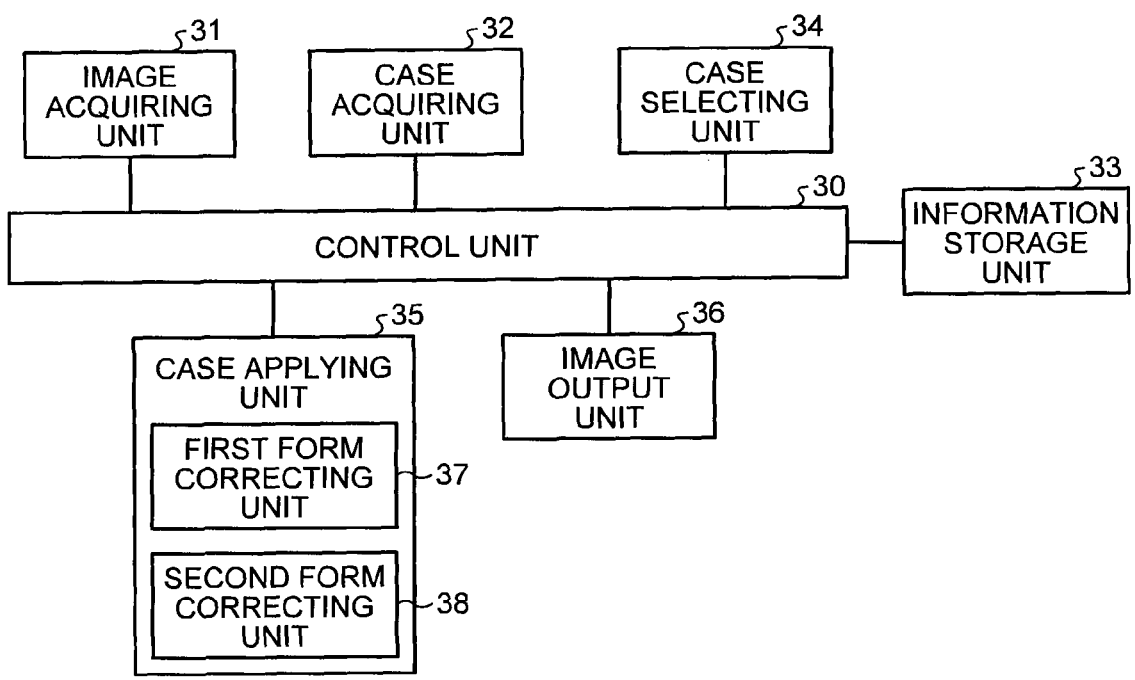
FIG. 10 is a functional block diagram of a first embodiment of the image processing system according to the present embodiment.

The outline has been described. The following describes the functional configuration to carry out the retouching described above and processing performed by each functional unit in detail. FIG. 10 is a functional block diagram of a first embodiment of the image processing apparatus 10. The image processing apparatus 10 includes a control unit 30, an image acquiring unit 31, a case acquiring unit 32, an information storage unit 33, a case selecting unit 34, a case applying unit 35, and an image output unit 36 as the functional units. The case applying unit 35 includes a first form correcting unit 37 and a second form correcting unit 38.

The control unit 30 controls the whole of the image processing apparatus 10. The image acquiring unit 31 receives input of an image from the image reading device 12, the image capturing device 13, or the server 11 illustrated in FIG. 1 and acquires the image. While it is herein described that the image acquiring unit 31 acquires an image, it actually acquires image data of the image. In acquisition of an image, the image acquiring unit 31 may acquire image data received from the image capturing device 13, for example. Alternatively, the control unit 30 may request image data from the server 11 in response to an instruction from the user, and thus the image acquiring unit 31 may acquire the read image data.

In response to acquisition of the image in the image acquiring unit 31, the case acquiring unit 32 acquires a plurality of pieces of case information stored in the information storage unit 33 and transfers the pieces of case information to the case selecting unit 34. The case acquiring unit 32 may acquire all the pieces of case information stored in the information storage unit 33. Alternatively, when the user selects the category described above, the case acquiring unit 32 may acquire only the case information in the category. If the user selects the transfer type as the type, the case acquiring unit 32 may acquire only the case information including the transfer type in the case identification information.

The case selecting unit 34 arranges and displays the pieces of case information received from the case acquiring unit 32 on the display unit based on the case identification information included in each piece of case information. The case selecting unit 34 then receives selection of case information from the user. The case applying unit 35 specifies the format of retouching, that is the type of retouching, in the case from the case identification information included in the case information selected by the user. If the type is the standard type, the case applying unit 35 requests the first form correcting unit 37 to perform retouching; whereas if the type is the transfer type, the case applying unit 35 requests the second form correcting unit 38 to perform retouching.

When receiving the request, the first form correcting unit 37 performs retouching of the standard type on the image acquired by the image acquiring unit 31 in accordance with the contents of retouching specified based on the retouching-time reference information included in the case information selected by the user. When receiving the request, the second form correcting unit 38 performs retouching of the transfer type on the image acquired by the image acquiring unit 31 in accordance with the contents of retouching specified based on the retouching-time reference information included in the case information selected by the user.

After the retouching is finished and a retouched image is obtained, the case applying unit 35 transfers the retouched image to the image output unit 36. The image output unit 36 displays the retouched image on the display unit or prints to output the retouched image and stores the retouched image in the information storage unit 33. These types of output can be performed in accordance with preset contents.

These functional units are provided by the CPU 21 illustrated in FIG. 2 reading and executing the computer program for performing image retouching stored in the auxiliary storage device 23 in the storage device 22. The information storage unit 33 may be a storage device included in the server 11. Alternatively, the information storage unit 33 may be the auxiliary storage device 23 included in the image processing apparatus 10 or another device, such as an external storage device, connected to the cable or the network 15.

Figure 11:
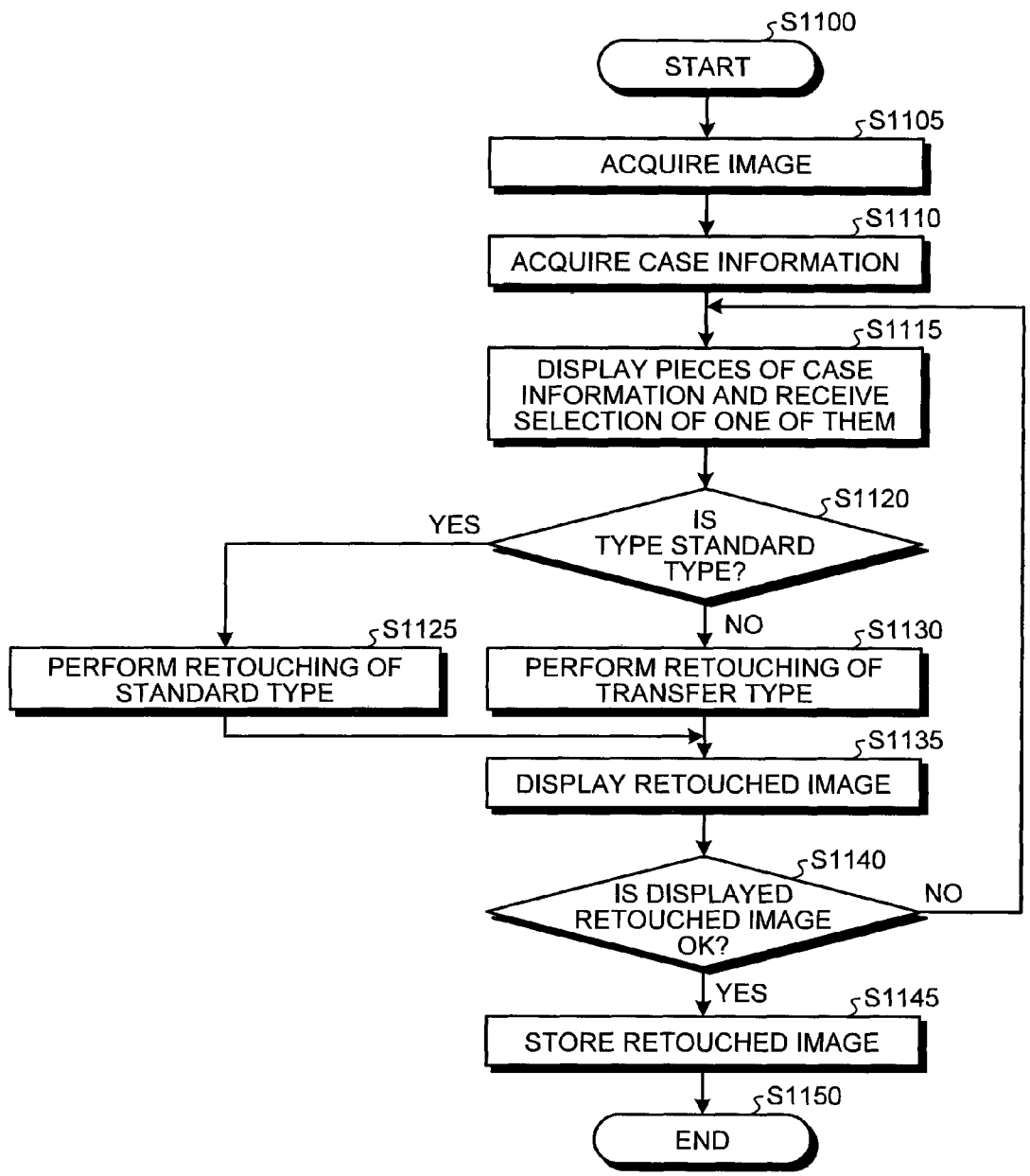
FIG. 11 is a flowchart of image processing performed by the image processing system illustrated in FIG. 10.

The following describes the processing for retouching an image performed by the image processing apparatus 10 illustrated in FIG. 10 in detail with reference to the flowchart illustrated in FIG. 11. The image acquiring unit 31 receives input of an image from the image capturing device 13 or the like, whereby the processing is started at Step S1100. The image acquiring unit 31 acquires the input image at Step S1105. In response to acquisition of the image in the image acquiring unit 31, the case acquiring unit 32 acquires a plurality of pieces of case information from the information storage unit 33 at Step S1110. In this example, the case acquiring unit 32 acquires all the pieces of case information stored in the information storage unit 33.

The case selecting unit 34 arranges and displays pieces of case information acquired by the case acquiring unit 32 on the display unit based on the case identification information included in the pieces of case information at Step S1115. An example of the simplest arrangement is arrangement of the pieces of case information in order of the case ID. Because the case IDs are each formed of a numerical value, a letter of alphabet, and/or the like, the pieces of case information may be arranged in ascending order from 1 and/or in alphabetical order. Instead of this, the pieces of case information may be arranged in order of the photographing position or the photographing date and time.

The case selecting unit 34 may arrange the pieces of case information in order of an item specified by user interaction, that is, by a dialog with the user. Alternatively, the case selecting unit 34 may derive arrangement based on a predetermined item, such as the color tone information, and arrange the pieces of case information.

The pieces of case information need to be appropriately displayed in light of the difference in retouching type. In the case of the standard type, two images (case images) before and after retouching are displayed side by side or alternately. In the case of the transfer type, a reference image referred to as a target alone is displayed. This enables the target specification.

Regarding the display method of the case information, display including a retouched image corresponding to the image (input image) acquired by the image acquiring unit 31 may be performed. In the case of the standard type, three images obtained by adding the retouched image to the two case images are displayed side by side or alternately. In the case of the transfer type two images obtained by adding the retouched image to the reference image are displayed side by side or alternately. This enables the result specification.

The user selects preferable case information from the pieces of case information displayed as described above, and the case selecting unit 34 receives the case information selected by the user at Step S1115. In response to selection of the case information, the case applying unit 35 refers to the type in the case identification information and identifies the type to apply the case information to the input image at Step S1120. If the type is the standard type, the processing goes to Step S1125. By contrast, if the type is the transfer type, the processing goes to Step S1130.

The first form correcting unit 37 performs retouching of the standard type at Step S1125, whereas the second form correcting unit 38 performs retouching of the transfer type at Step S1130. The retouching is performed by retrieving and applying the image processing operator and the image processing parameter in the retouching-time reference information included in the case information. A tone curve, sharpness, or edge enhancement is specified as the image processing operator, for example. Control point information used for the image processing operator is specified as the image processing parameter, for example. If the tone curve is specified, the first form correcting unit 37 performs tone curve conversion; whereas if the sharpness is specified, the first form correcting unit 37 performs sharpness conversion. Because these conversions are publicly known, explanations of the contents thereof are omitted. The number of image processing operators is not necessarily one and may be two or more.

The tone curve or the like is specified for the standard type, whereas a transfer operator is specified for the transfer type. At this time, the reference image is specified as the image processing parameter. The retouching of the transfer type may be performed using a known method, such as the color transfer. After the retouching of the image is finished, the first form correcting unit 37 or the second form correcting unit 38 transfers the retouched image to the case applying unit 35 as the retouching result.

The image output unit 36 receives the retouched image from the case applying unit 35 and presents the retouched image to the user by displaying it on the display unit, for example, at Step S1135. Subsequently, it is determined whether the presented retouched image is good at Step S1140. The image output unit 36 displays an OK button and a start over button, for example. If the user presses the OK button, it is determined that the retouched image is good. By contrast, if the user presses the start over button, it is determined that the retouched image is not good.

If it is determined that the retouched image is good at Step S1140, the processing goes to Step S1145. The image output unit 36 stores the retouched image in the information storage unit 33, and the processing is terminated at Step S1150. By contrast, if it is determined that the retouched image is not good, the system control is returned to Step S1115. The user selects case information again, and the case selecting unit 34 receives the selection.

While the embodiment described above can perform retouching of the two types, it is possible to limit the retouching to one of the types and perform retouching of the type alone. In this case, the case identification information does not necessarily include the item of the type. The case applying unit 35 need not make a determination to identify the type and simply need to have any one of the correcting units alone.

Figure 12:
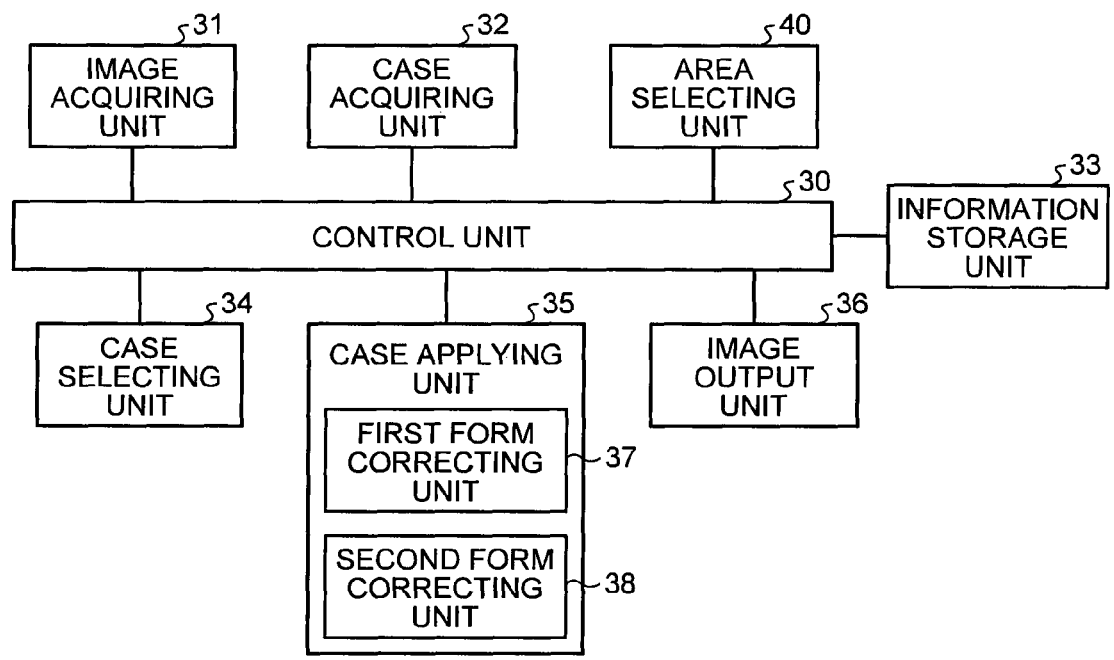
FIG. 12 is a functional block diagram of a second embodiment of the image processing system according to the present embodiment.

The following describes another functional configuration and processing performed by each functional unit of the image processing apparatus 10. FIG. 12 is a functional block diagram of a second embodiment of the image processing apparatus 10. Similar to the image processing apparatus 10 illustrated in FIG. 10, the image processing apparatus 10 includes a control unit 30, an image acquiring unit 31, a case acquiring unit 32, an information storage unit 33, a case selecting unit 34, a case applying unit 35, and an image output unit 36. The case applying unit 35 includes a first form correcting unit 37 and a second form correcting unit 38. The embodiment illustrated in FIG. 12 further includes an area selecting unit 40. Because the same functional units as those described above, such as the control unit 30, have already been explained, the following describes only the area selecting unit 40.

The area selecting unit 40 is also provided by the CPU 21 executing a computer program and selects an area to be retouched. The area selecting unit 40 limits an area to be retouched in the input image.

Both the standard type and the transfer type can perform retouching on the entire image based on the case information. The standard type is suitably used for simple retouching of making the color tone brighter and clearer, for example. The transfer type is suitably used for an image having a similar scene in the entire image. There are such suitable cases for the retouching on the entire image, but an intended image may not possibly be obtained in the retouching. Examples of such retouching include retouching to make only the face a little brighter, retouching to suppress only the blue component a little, and retouching to emphasize only the high-frequency component.

To retouch only a specific area as described above, the area selecting unit 40 selects the area to be retouched, and the case applying unit 35 retouches the selected area. The area may be selected using a known method, such as a method for selecting an area with the hue, a method in which the user traces an area boundary, a method in which the user traces an area surface with a brush, face area extraction, and fast Fourier transform (FFT), for example.

Figure 13:
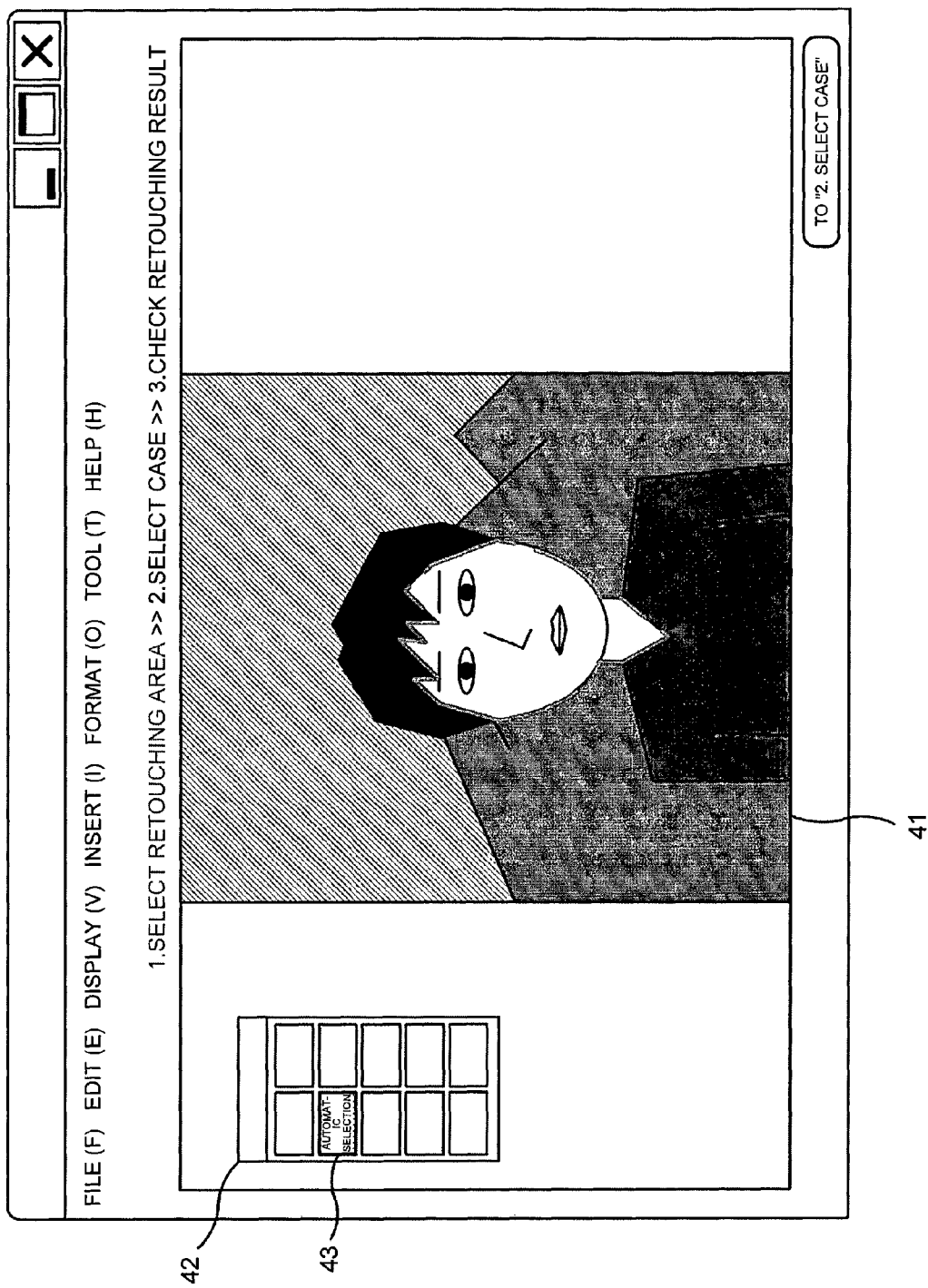
FIG. 13 is an exemplary schematic of a screen on which an area selecting unit selects an area to be retouched.

A specific explanation will be made with reference to FIG. 13. FIG. 13 illustrates an input image 41 and a toolbox 42 on the left of the input image 41. In the toolbox 42, various types of tools are displayed as icons, and an automatic selection tool 43 is selected. The automatic selection tool 43 automatically selects a pixel at a position clicked with a mouse and an adjacent pixel having an approximate color.

In FIG. 13, because a pixel displaying the skin of the face is clicked, all the adjacent pixels having the skin color are extracted. Thus, an area formed of all the extracted pixels is selected and indicated by the dashed line.

The area selected by, the area selecting unit 40 is not limited to an area in an image space (a plane). The area selecting unit 40 may select a specific channel area of a color image, such as a channel area of an image signal represented by red, blue, or green. Alternatively, the area selecting unit 40 may select a frequency area of an image signal having a specific band in a frequency space. The area selecting unit 40 does not necessarily select one of the three areas but may select an area obtained by combining two or more of the three areas.

Figure 14:
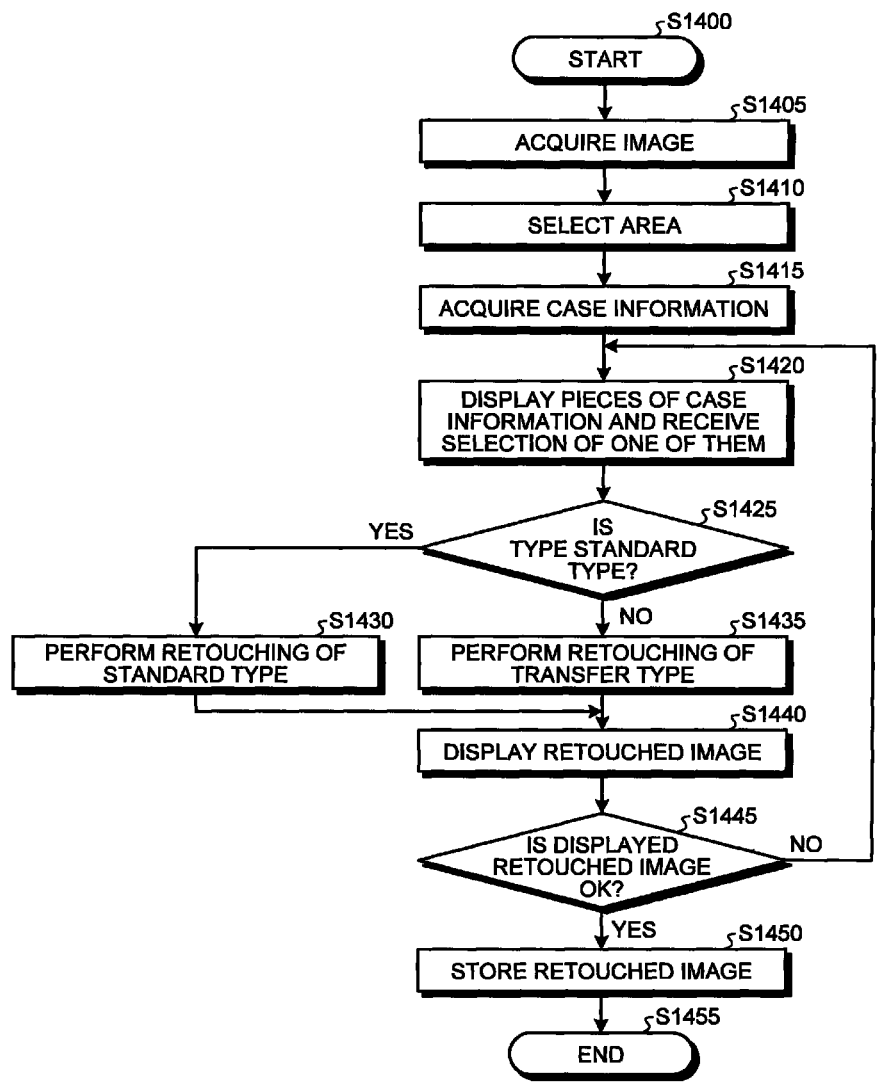
FIG. 14 is a flowchart of image processing performed by the image processing system illustrated in FIG. 12.

The following describes processing for retouching an image performed by the image processing apparatus 10 according to the present embodiment with reference to the flowchart illustrated in FIG. 14. The processing is started at Step S1400. As in the flowchart in FIG. 11, the image acquiring unit 31 receives input of an image from the image capturing device 13 or the like, whereby the processing is started. Because processing at Step S1405 and from Step S1415 to Step S1455 is the same as that from Step S1105 to Step S1150 illustrated in FIG. 11, explanations thereof are omitted.

The area selecting unit 40 receives specification of an area from the user and selects the specified area at Step S1410. The information of the selected area is transmitted to the case applying unit 35. The case applying unit 35 specifies the area to be retouched and performs retouching on the area.

Figure 15:
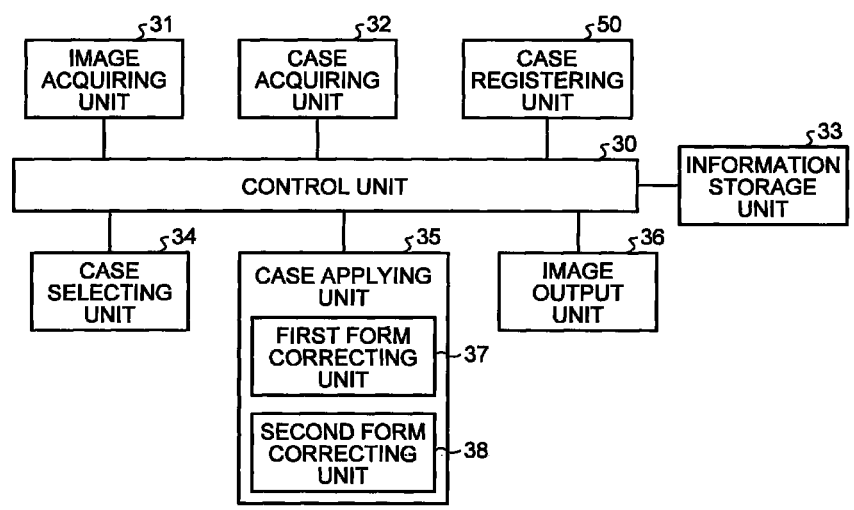
FIG. 15 is a functional block diagram of a third embodiment of the image processing system according to the present embodiment.

The following describes still another functional configuration and processing performed by each functional unit of the image processing apparatus 10. FIG. 15 is a functional block diagram of a third embodiment of the image processing apparatus 10. Similar to the image processing apparatus 10 illustrated in FIG. 10, the image processing apparatus 10 includes a control unit 30, an image acquiring unit 31, a case acquiring unit 32, an information storage unit 33, a case selecting unit 34, a case applying unit 35, and an image output unit 36. The case applying unit 35 includes a first form correcting unit 37 and a second form correcting unit 38. The embodiment illustrated in FIG. 15 further includes a case registering unit 50. Because the same functional units as those described above, such as the control unit 30, have already been explained, the following describes only the case registering unit 50. The image processing apparatus 10 may include both the case registering unit 50 and the area selecting unit 40.

The case registering unit 50 is provided by the CPU 21 executing a computer program. The case registering unit 50 creates new case information by adding additional information to the retouched image resulting from image retouching and stores and registers the new case information in the information storage unit 33. The case registering unit 50 specifies contents corresponding to the respective items based on the expression format illustrated in FIG. 4 and registers the contents as one piece of case information. Thus, the contents corresponding to the respective items other than the retouched image serve as the additional information. The type specified in the retouching is used as the type without any change.

If the type is the standard type, the image processing operator and the image processing parameter referred to in the retouching are specified in the retouching-time reference information without any change. The contents of the input image and the retouched image are specified as the contents of the image A and the image B illustrated in FIG. 4 in the case identification information. In other words, the file name and the color tone information of the input image and the retouched image are specified. In terms of the other information, each piece of information in the case information referred to in the retouching is specified as a default value. Therefore, information desired to be corrected can be corrected by user interaction if correction is required.

Also when the type is the transfer type, the image processing operator and the image processing parameter referred to in the retouching are specified in the retouching-time reference information without any change. The contents of the retouched image are specified as the contents of the image B in the case identification information. The other information is specified in the same manner as in the standard type.

By creating a piece of new case information and adding it in this manner, the case information can be reused. Because the standard type includes two case images as illustrated in FIG. 5, it is possible to use the two case images as reference images and registers them as two pieces of case information of the transfer type. This can add the case information of the transfer type besides the case information of the standard type. Addition of the case information enables the user to obtain a more desired retouched image.

Figure 16:
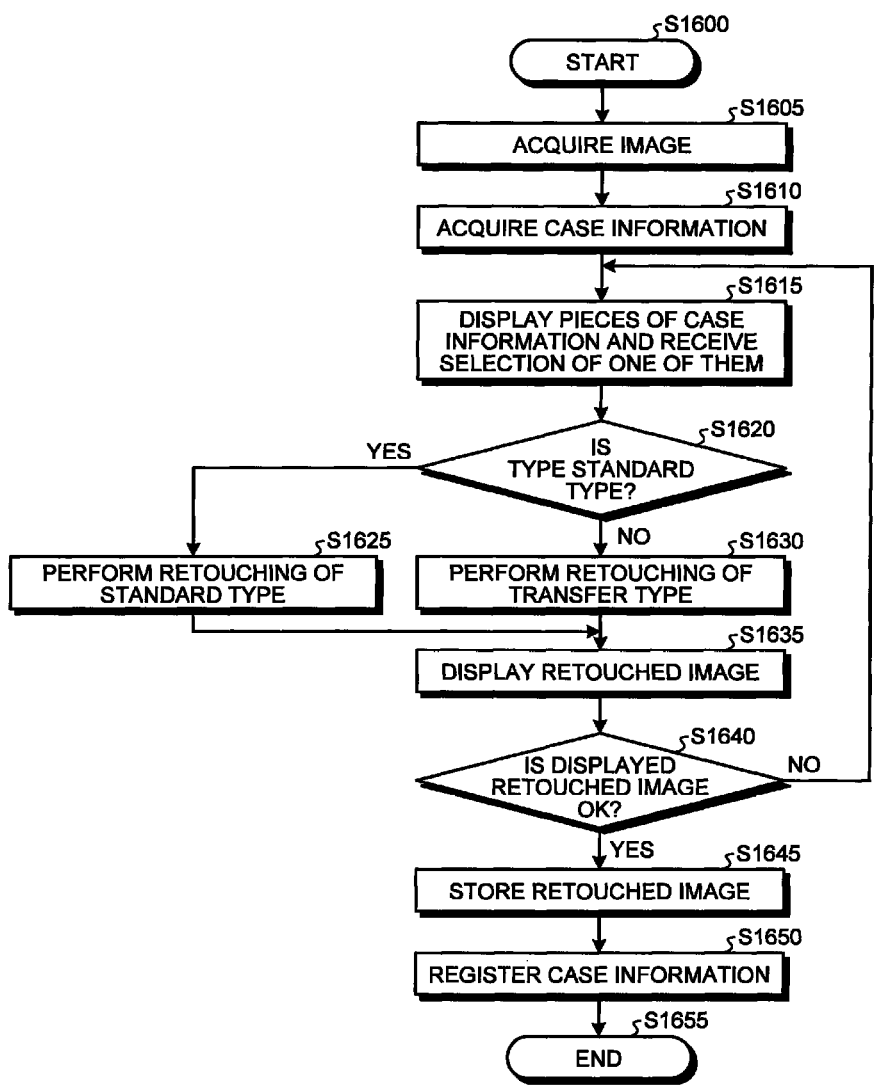
FIG. 16 is a flowchart of image processing performed by the image processing system illustrated in FIG. 15.

The following describes processing for retouching an image performed by the image processing apparatus 10 according to the present embodiment with reference to the flowchart illustrated in FIG. 16. The processing is started at Step S1600. As in the flowchart in FIG. 11, the image acquiring unit 31 receives input of an image from the image capturing device 13 or the like, whereby the processing is started. Because processing from Step S1605 to Step S1645 and at Step S1655 is the same as that from Step S1105 to Step S1150 illustrated in FIG. 11, explanations thereof are omitted.

The case registering unit 50 uses the retouching performed on the input image as an additional case and stores and registers case information obtained in the case in the information storage unit 33 as additional case information at Step S1650. The registered case information is presented to the user in subsequent image retouching and is made selectable.

Figure 17:
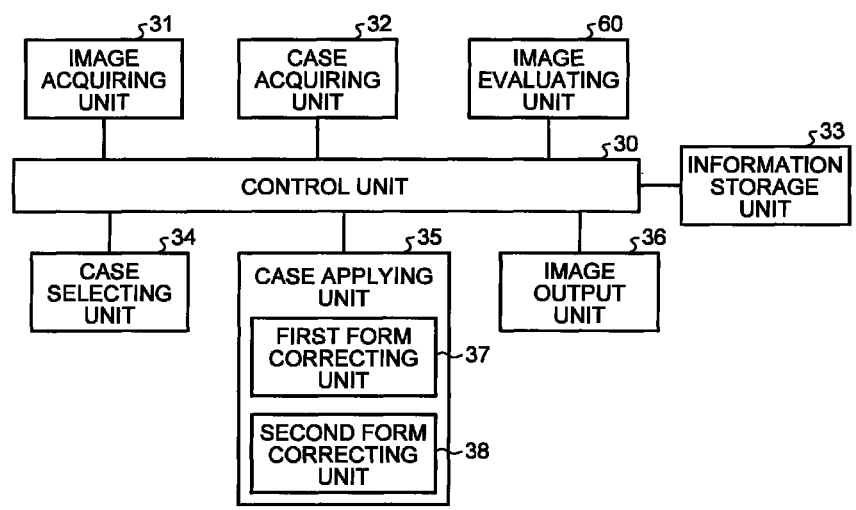
FIG. 17 is a functional block diagram of a fourth embodiment of the image processing system according to the present embodiment.

The following describes still another functional configuration and processing performed by each functional unit of the image processing apparatus 10. FIG. 17 is a functional block diagram of a fourth embodiment of the image processing apparatus 10. Similar to the image processing apparatus 10 illustrated in FIG. 10, the image processing apparatus 10 includes a control unit 30, an image acquiring unit 31, a case acquiring unit 32, an information storage unit 33, a case selecting unit 34, a case applying unit 35, and an image output unit 36. The case applying unit 35 includes a first form correcting unit 37 and a second form correcting unit 38. The embodiment illustrated in FIG. 17 further includes an image evaluating unit 60. Because the same functional units as those described above, such as the control unit 30, have already been explained, the following describes only the image evaluating unit 60. The image processing apparatus 10 may include the image evaluating unit 60 and any one or both of the area selecting unit 40 and the case registering unit 50.

The image evaluating unit 60 is provided by the CPU 21 executing a computer program and displays an index used to evaluate the quality of the retouched image on the display unit. If the user is not an expert, he/she cannot determine whether a desired image is obtained simply by viewing the retouched image because of the lack of a sufficient discerning eye. Thus, it is preferable that the image evaluating unit 60 be provided to display an evaluation index that enables the user to make objective evaluation.

Figure 18:
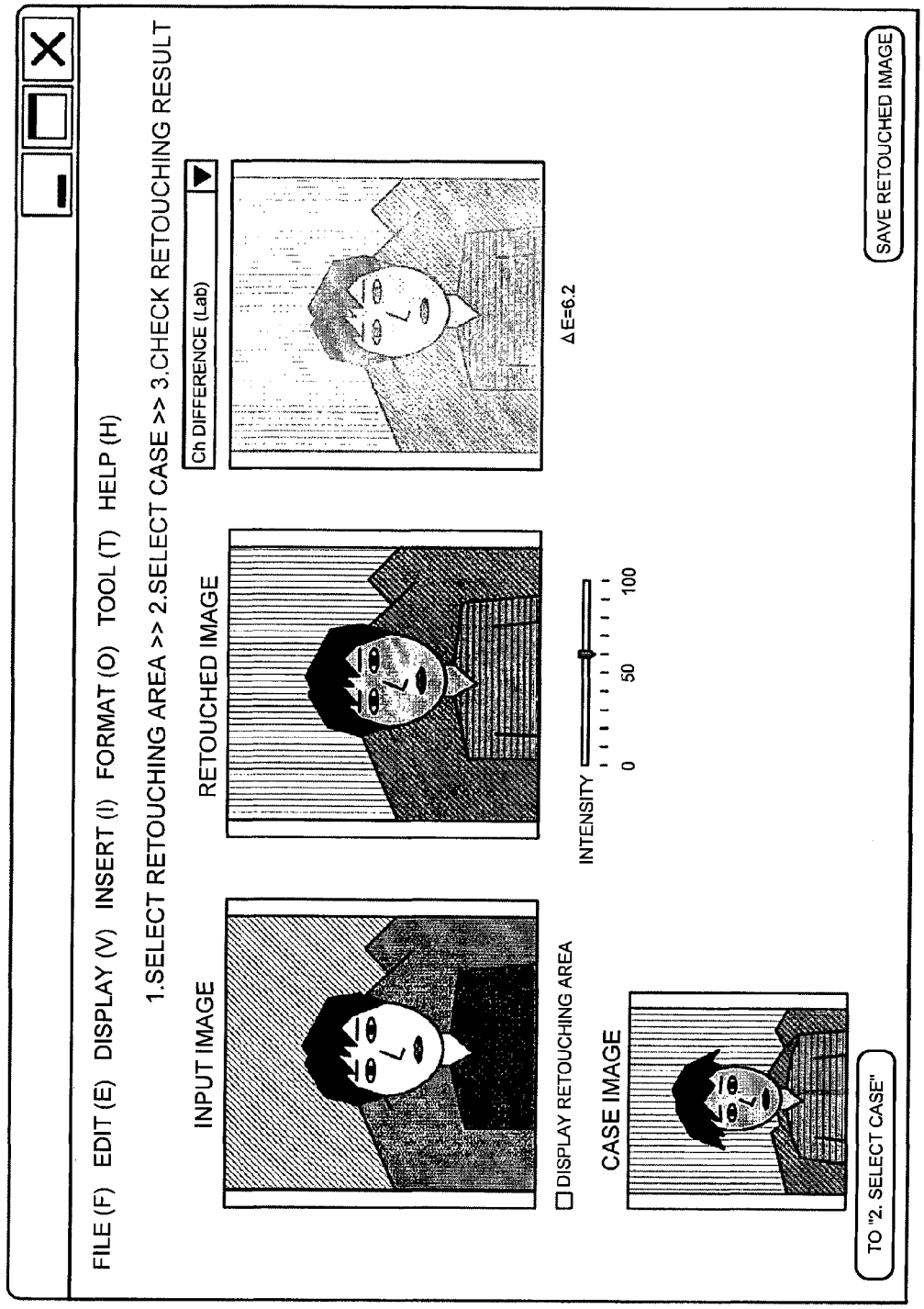
FIG. 18 is a schematic of an example of a screen on which an image evaluating unit displays an evaluation index for causing a user to perform evaluation.

To provide the evaluation index, the image evaluating unit 60 uses at least one of pair-of-image evaluation and single evaluation. The following describes the evaluation index displayed by the image evaluating unit 60 with reference to FIG. 18. FIG. 18 illustrates an input image, a retouched image, and a Ch difference (lightness L) image in order from the left. The Ch difference image is an example of the evaluation index obtained by the pair-of-image evaluation. A value ΔE (color difference) is indicated as a numerical value under the Ch difference image. The value ΔE is also an example of the evaluation index obtained by the pair-of-image evaluation. In other words, the single evaluation and the pair-of-image evaluation are different from each other in that the evaluation index is obtained from one image or two images.

Examples of the evaluation index obtained by the pair-of-image evaluation include a signal-to-noise ratio (S/N), a mean squared error (MSE), and ΔE. These evaluation indexes enable the user to objectively understand how much change occurs at the signal level. Alternatively, an evaluation index called structural similarity (SSIM), which has a higher degree of matching with a subjective view than that of the S/N and the MSE, may be introduced.

Examples of the evaluation index obtained by the single evaluation include a histogram of lightness or each color channel. The histogram indicates how many pixel values of R, G, and B, which constitute an image, are used with a bar chart, for example. By viewing the histogram, the user can objectively understand the state of the entire image, thereby making an appropriate determination. Examples of the factor used to evaluate the image quality include contrast, sharpness, clarity, and granularity besides lightness and the like. Evaluation indexes based on these factors may also be introduced.

Examples of the index obtained by the single evaluation further include a saliency map. The saliency map is a method for representing the conspicuity according to the human visual property using a pixel value on an image basis. The map can indicate a part to which the user should pay attention for evaluation. These evaluation indexes are given by way of example only, and other evaluation indexes may be added.

Examples of the image or the pair of images to be evaluated include a retouched image, and a retouched image and an input image or a reference image or a case image. The image or the pair of images to be evaluated may be other input images, reference images, or other input images and reference images, for example. The pair-of-image evaluation of the input image and the reference image or the case image is used as a base to achieve future arrangement of more appropriate case information. The evaluation of the retouched image is used as objective information for determining an obtained result. The evaluation enables the user to make an evaluation reliably and to increase the level of the skill required for image retouching.

Figure 19:
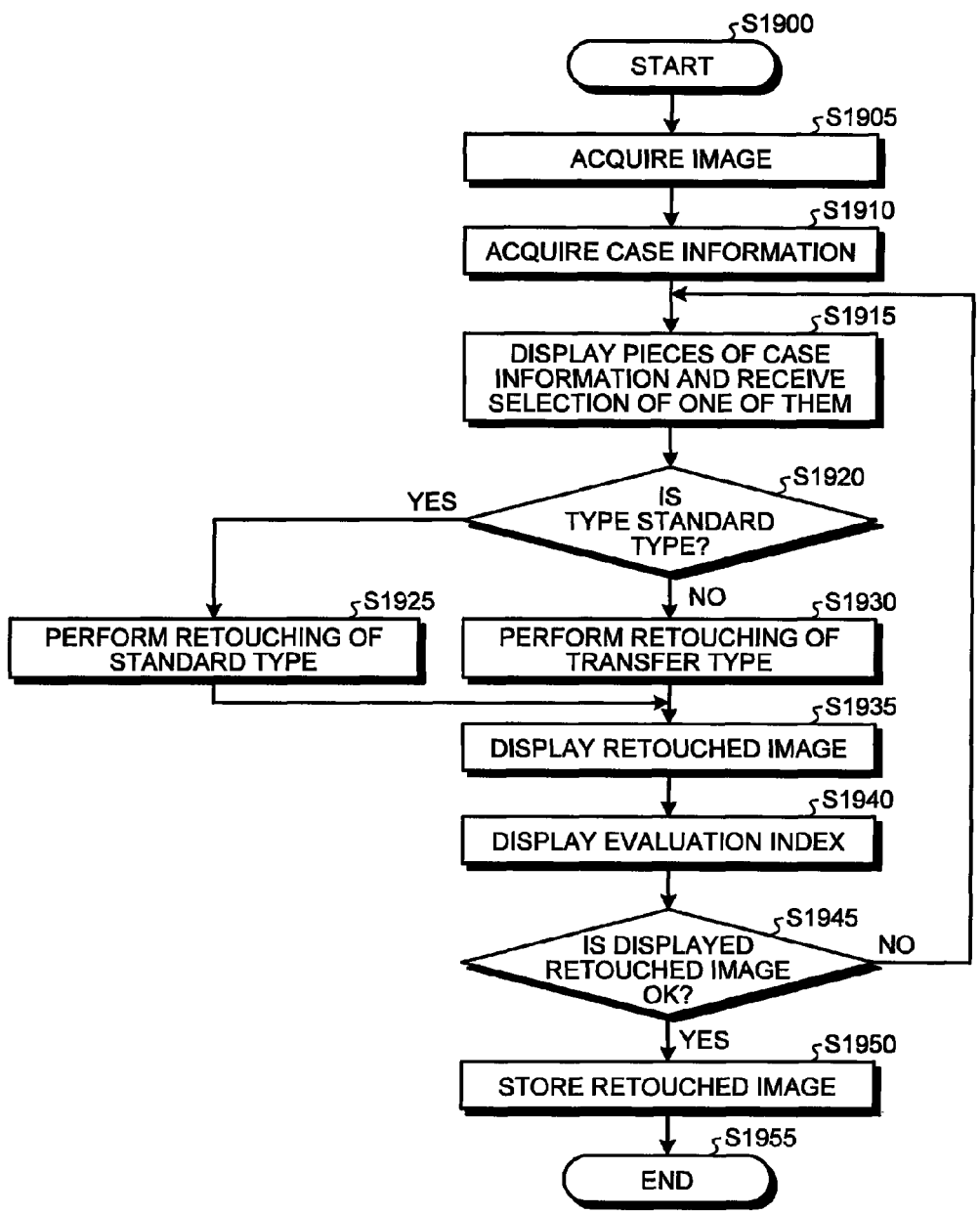
FIG. 19 is a flowchart of image processing performed by the image processing system illustrated in FIG. 17.

The following describes processing for retouching an image performed by the image processing apparatus 10 according to the present embodiment with reference to the flowchart illustrated in FIG. 19. The processing is started at Step S1900. As in the flowchart in FIG. 11, the image acquiring unit 31 receives input of an image from the image capturing device 13 or the like, whereby the processing is started. Because processing from Step S1905 to Step S1935 and from Step S1945 to Step S1655 is the same as that from Step S1105 to Step S1150 illustrated in FIG. 11, explanations thereof are omitted.

The image evaluating unit 60 displays an evaluation index for causing the user to evaluate the quality of the retouched image at Step S1940. The image evaluating unit 60 generates the abovementioned histogram being an index indicating the quality of the retouched image, using the information of the retouched image, such as the pixel values of RGB. The image evaluating unit 60 then displays the histogram on the display unit to present it to the user. The image evaluating unit 60 uses information of the retouched image and the input image or the reference image or the case image, thereby deriving the S/N, for example. The image evaluating unit 60 then displays the numerical value of the S/N on the display unit to present it to the user.

By arranging and displaying the pieces of case information based on the case identification information as described above, it is possible to achieve intuitive and simple use and reach a desired result by small workload. By enabling the user to select a desired case from a lot of cases, it is possible to increase the processing flexibility. Because the case identification information includes the color tone information and the scene name, for example, and the pieces of case information are appropriately arranged based on these elements, the user can intuitively specify a target. The cases can be displayed regardless of the type, which also enables the user to intuitively specify the target.

Displaying the images including the retouched image enables the user to intuitively specify a result. Selecting an area can limit the processing object, making it possible to increase the effects of image retouching. Enabling registration of an additional case can further increase the processing flexibility. If a certain case in the standard type is registered, the information can be used as cases of the transfer type. This can facilitate collection and accumulation of the cases of the transfer type.

Displaying the evaluation index used for image evaluation can provide an objective basis for determination to the user. This enables the user to make an evaluation more reliably and to increase the level of the skill required for image retouching.

While the explanation has been made of the image processing apparatus, the image processing method, and the processing performed by the computer program according to the present invention in detail with reference to the embodiments illustrated in the drawings, the present invention is not limited to the embodiments above. The present invention may be embodied in other forms, and various additions, changes, and omissions may be made as long as they are conceivable by those skilled in the art. Any of these aspects is included in the spirit and scope of the present invention as long as it can provide the advantageous effects of the present invention. Thus, the present invention can also provide an image processing system including the image processing apparatus and a recording medium storing therein the computer program executed by a computer.

An embodiment can achieve intuitive and simple use, reach a desired result by smaller workload, and increase the processing flexibility.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST 10 image processing apparatus
11 server
12 image reading device
13 image capturing device
14 cable
15 network
20 input I/F
21 CPU
22 storage device
23 auxiliary storage device
24 output I/F
25 storage medium
26 drive
27 controller
30 control unit
31 image acquiring unit
32 case acquiring unit
33 information storage unit
34 case selecting unit
35 case applying unit
36 image output unit
37 first form correcting unit
38 second form correcting unit
40 area selecting unit
41 input image
42 toolbox
43 automatic selection tool
50 case registering unit
60 image evaluating unit
Patent Literature 1: Japanese Patent Application Laid-open No. 2007-221591
Patent Literature 2: Japanese Patent Application Laid-open No. 2004-129226
Patent Literature 3: Japanese Patent No. 4646735
Patent Literature 4: Japanese Patent Application Laid-open No. 2008-294969
Patent Literature 5: Japanese Patent No. 4910948
Patent Literature 6: Japanese Patent Application Laid-open No. 2002-171408
Patent Literature 7: Japanese Patent No. 4421761
Patent Literature 8: Japanese Patent Application Laid-open No. 2006-080746
Patent Literature 9: Japanese Patent No. 4985243

The invention claimed is:

1. An image processing system a performs retouching of an image, the age processing system comprising:
   circuitry configured to
   store a plurality of pieces of case information each including reference information for specifying contents of retouching;
   receive input of the image and acquire the image;
   control display of a plurality of the stored pieces of the case information on a display based on reference information included in each of the pieces of case information and receive selection of case information from a user; and
   retouch the acquired image in accordance with contents of retouching specified by the reference information included in the selected case information,
   wherein
   the case information is one of a standard type that retouches the image using a specified parameter of image processing and a transfer type that retouches the image such that the image approaches a reference image referred to as a target,
   the circuitry controls display of at least one piece of case information of the transfer type by displaying one reference image referred to as a target, and controls display of at least one piece of case information of the standard type by displaying two case images before and after retouching side by side or alternately, and
   the at least one piece of case information of the transfer type and the at least one piece of case information of the standard type are displayed together on a selection screen such that the user selects the selected case information from the selection screen.

2. The image processing system according to claim 1, wherein the case information includes at least one of a case identifier assigned to the case, a photographing position of an image used in the case, photographing date and time, an image file name, color tone information, a scene name of a photographing scene, a subject name of a photographing subject, impression expression expressing an impression of the image, and selected area information when an area in the image is selected.

3. The image processing system according to claim 1, wherein the circuitry displays the retouched image with the reference image or the two case images side by side or alternately as the selected case information used for retouching image.

4. The image processing system according to claim 1, wherein the circuitry is further configured to receive specification of at least one of an area in an image space, a channel area of an image signal, and a frequency area of the image signal as an area in which the retouching is to be performed on the acquired image and select at least one specified area.

5. The image processing system according to claim 1, wherein the circuitry is further configured to use retouching performed on the acquired image as an additional case and to store case information obtained in the retouching as additional case information.

6. The image processing system according to claim 1, wherein the circuitry is further configured to generate an evaluation index using information of a retouched image or the information of the retouched image and information of an acquired image or a case image and displays the evaluation index on the display in order to allow the user to evaluate quality of the retouched image.

7. An image processing method performed by an image processing system that performs retouching of an image, the image processing system including circuitry configured to store a plurality of pieces of case information each including reference information for specifying contents of retouching, the image processing method comprising:

receiving input of the image and acquiring the image;

controlling display of a plurality of the stored pieces of the case information on a display based on reference information included in each of the pieces of case information;

receiving selection of one of the pieces of case information displayed on the display; and retouching the image acquired at the acquiring in accordance with the contents of the retouching specified by the reference information included in the selected case information, wherein the case information is one of a standard type that retouches the image using a specified parameter of image processing and a transfer type that retouches the image such that the image approaches an image referred to as a target, the controlling includes controlling display of at least one piece of case information of the transfer type by displaying one reference image referred to as a target and controlling display of at least one piece of case information of the standard type by displaying two case images before and after retouching side by side or alternately, and the at least one piece of case information of the transfer type and the at least one piece of case information of the standard type are displayed together on a selection screen such that the user selects the selected case information from the selection screen.

8. The image processing method according to claim 7, further comprising:

receiving specification of at least one of an area in an image space, a channel area of an image signal, and a frequency area of the image signal as an area in which the retouching is to be performed on the image acquired at the acquiring and then selecting at least one specified area;

storing, using the retouching performed at the retouching on the image acquired at the acquiring as an additional case, case information obtained in the retouching as additional case information; and generating an evaluation index using information of the retouched image or the information of the retouched image and information of the acquired image or the reference image or a case image and displaying the evaluation index on the display in order to allow a user to evaluate quality of the image retouched at the retouching.

9. A non-transitory computer-readable storage medium containing an information processing program, the program causing a computer to perform the image processing method according to claim 7.

* * * * *